United States Patent [19]

Hehl

[11] Patent Number: 5,039,299

[45] Date of Patent: Aug. 13, 1991

[54] INJECTION MOLDING MACHINE HAVING AN ARTICLE TRANSFER ARRANGEMENT

[76] Inventor: Karl Hehl, Arthur-Hehl-Str. 32, D-7298 Lossburg 1, Fed. Rep. of Germany

[21] Appl. No.: 406,833

[22] Filed: Sep. 11, 1989

[30] Foreign Application Priority Data

Sep. 12, 1988 [DE] Fed. Rep. of Germany ....... 3830964

[51] Int. Cl.$^5$ .............................................. B29C 45/42
[52] U.S. Cl. ..................... 425/556; 264/335; 414/751; 414/753; 414/779; 425/254; 425/444
[58] Field of Search ...................... 198/536, 950, 861.1; 249/67, 68; 264/335; 414/626, 751, 753, 779; 425/554, 556, 253, 254, 255, 436 R, 438, 444, 589; 901/6, 7, 15, 18.

[56] References Cited

U.S. PATENT DOCUMENTS

| 4,564,348 | 1/1986 | Hehl | 425/556 |
| 4,732,554 | 3/1988 | Hellmann | 425/444 |
| 4,850,783 | 7/1989 | Maekawa | 414/799 |

FOREIGN PATENT DOCUMENTS

218101 4/1987 European Pat. Off. .
1352736 7/1980 Fed. Rep. of Germany .
3432262 5/1985 Fed. Rep. of Germany .

OTHER PUBLICATIONS

Reis Prospectus "Reis–Linerar–Robot", 1984, pp. 1–4.

*Primary Examiner*—Timothy Heitbrink
*Attorney, Agent, or Firm*—Spencer & Frank

[57] ABSTRACT

An injection molding machine having a clamping unit and beams, which are disposed above the clamping unit and extend parallel and symmetrically to the vertical longitudinal plane of symmetry of the machine as far as to the rear end of the drive for the clamping unit. A pallet is provided, which is disposed over the drive and extends between the beams and has a supporting surface on which the moldings can be retained at predetermined locations, in which the moldings can be placed on the supporting surface by means of two carriages, which are horizontally movable in directions which are at right angles to each other. The carriages can be driven by flexible elements. Owing to such an arrangement, even delicate moldings can be removed from the injection molding machine, deposited and carried off quickly and in a gentle manner.

11 Claims, 17 Drawing Sheets

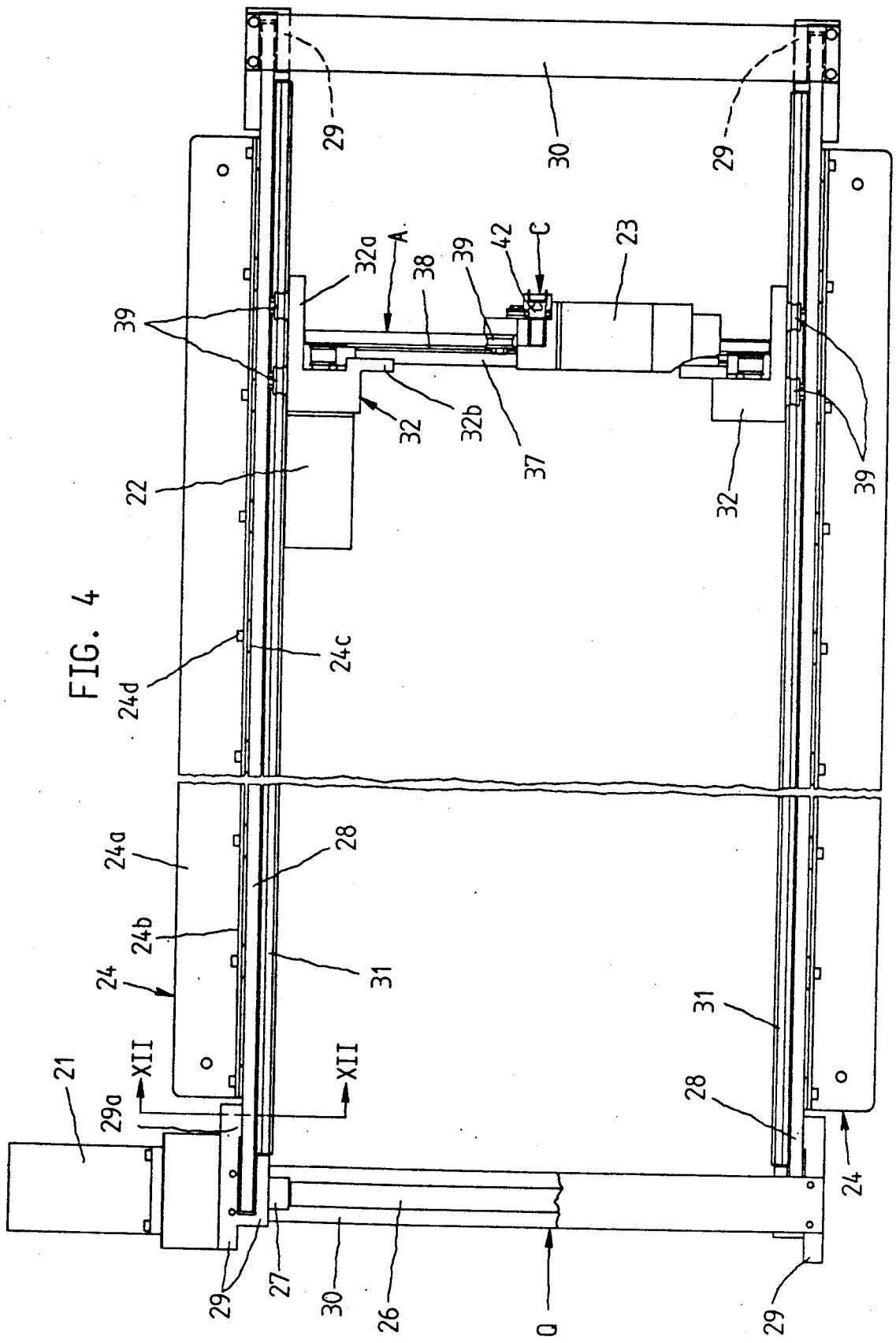

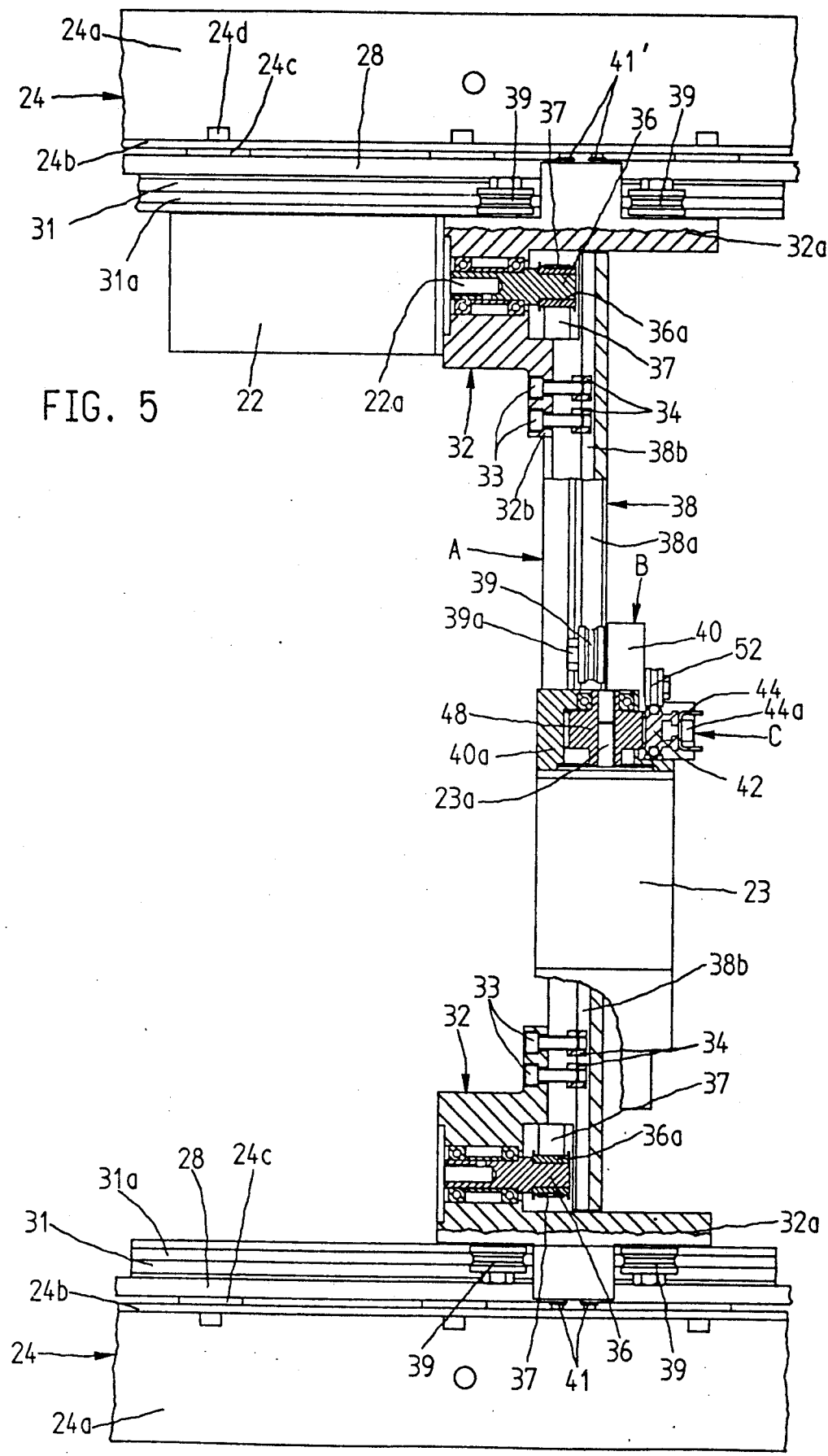

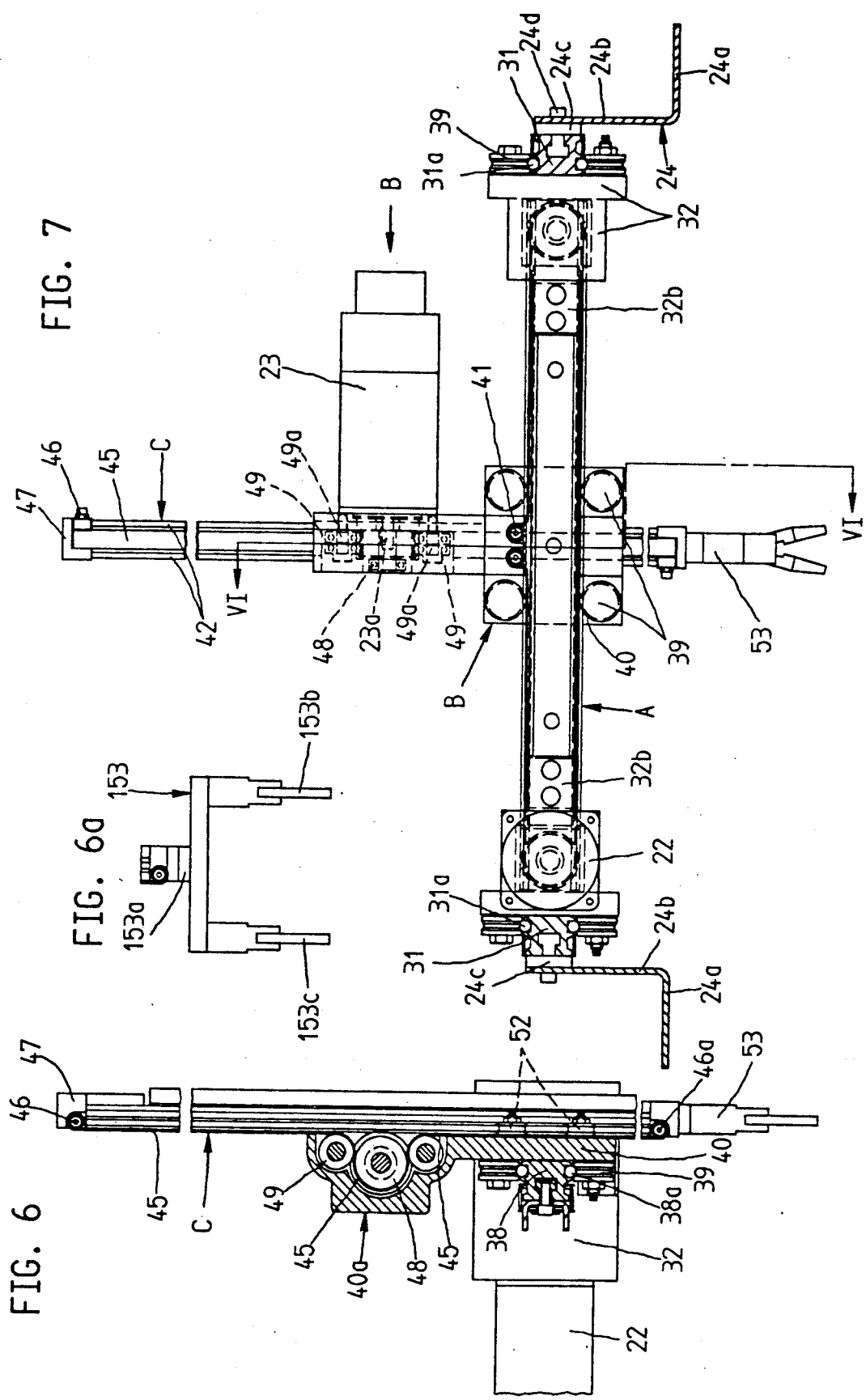

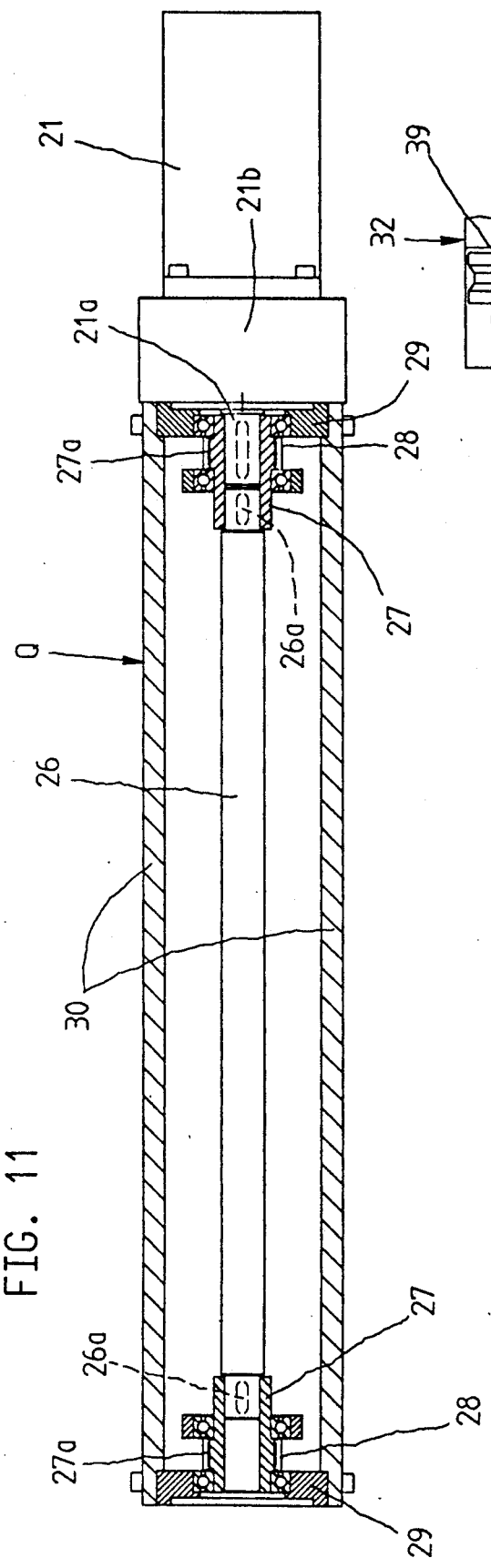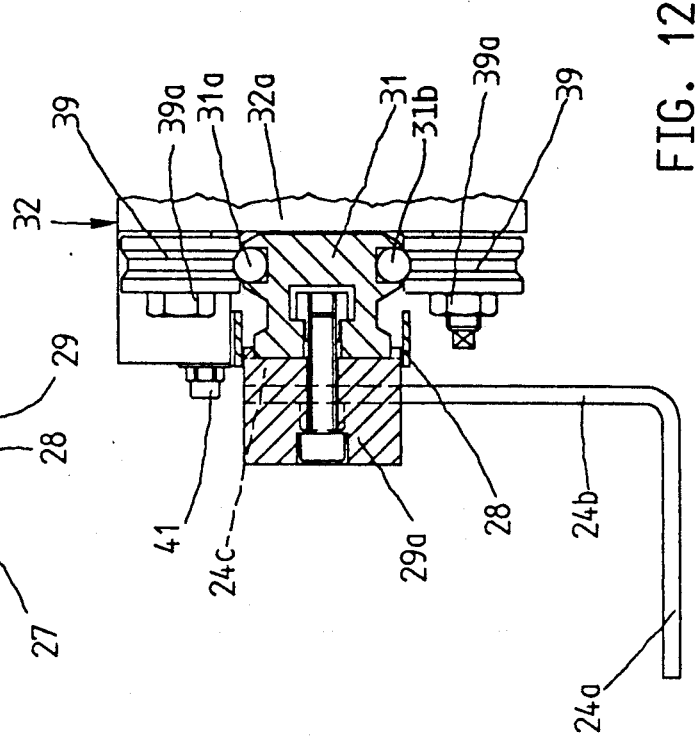
FIG. 11
FIG. 12

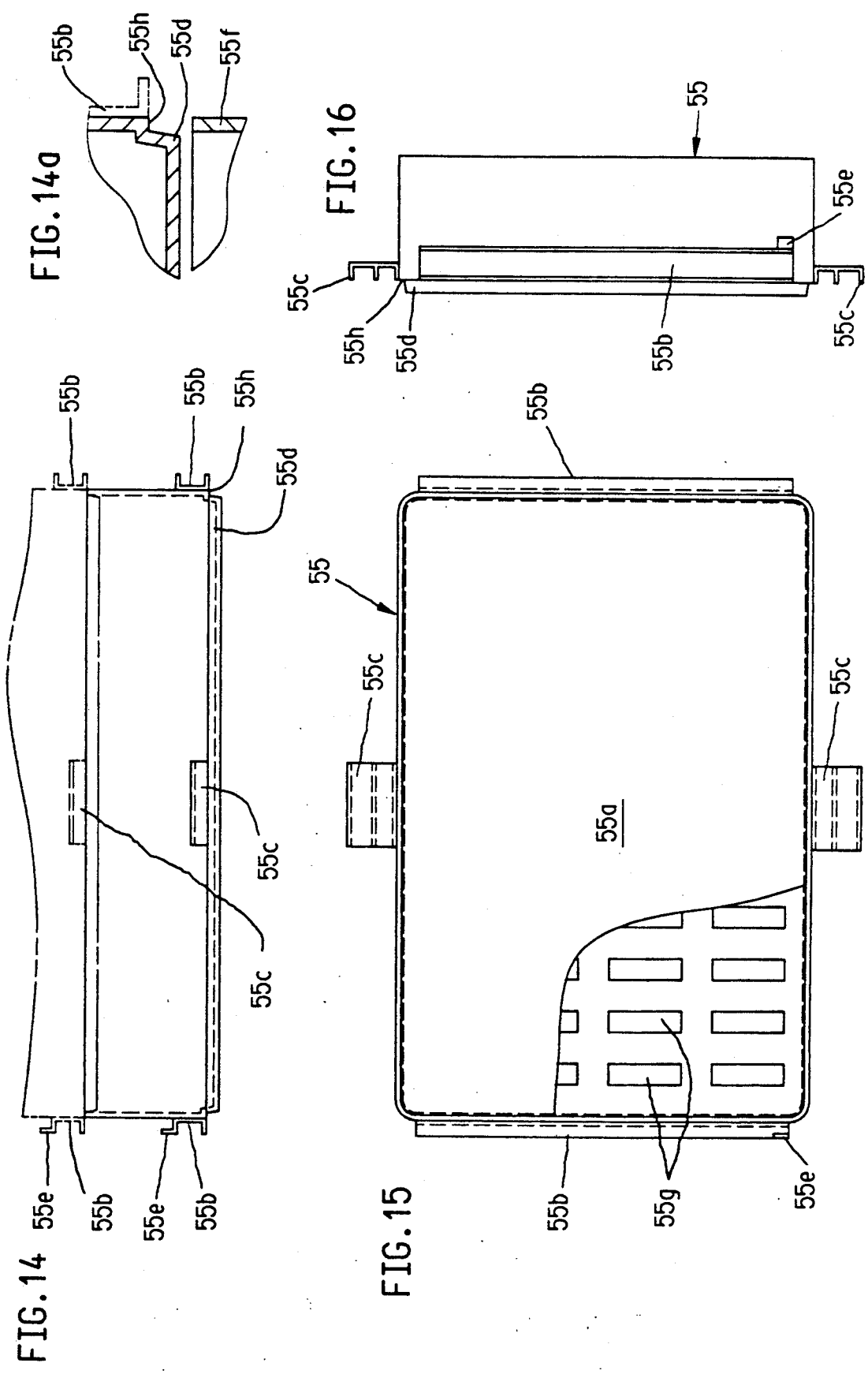

INJECTION MOLDING MACHINE HAVING AN ARTICLE TRANSFER ARRANGEMENT

BACKGROUND OF THE INVENTION

1. Field of the Invention

This invention relates to an injection molding machine comprising a clamping unit, which is provided with a movable mold support and with rearwardly extending drive means, which engage the movable mold support on the rear, also comprising a demolding device for linearly removing moldings from the injection mold when it is open, which demolding device comprises two horizontal beams, which extend above the clamping unit and are parallel and symmetrical to a vertical longitudinal plane of symmetry of the injection molding machine and are supported on the pedestal of the machine, also comprising a motor-driven first carriage, which is movable on rails provided on the beams from a demolding station disposed over the parting line of the injection mold to a delivery station, and a third carriage, which is supported by said first carriage and comprises a gripper, which is movable into the injection mold when it is open and adapted to remove the moldings out of said mold. The machine also comprises transfer means, which are disposed between said beams and operable to transfer said moldings to a conveyor.

2. Description of the Prior Art

In a known injection molding machine of that kind, which is known from German Patent Publication No. 23 52 736, the demolding device is designed only for association with a specific multiple-cavity injection mold and the moldings are carried off only in a blast passage, which extends transversely to the clamping direction of the clamping unit of the injection molding machine.

EP O 218 101 A1 discloses an injection molding machine in which the demolding device is asymmetrical and is so designed that a gripper can be moved only in the vertical longitudinal plane of symmetry of the injection mold.

Other known demolding devices comprise grippers, which are linearly movable only parallel to the parting line of the injection mold, i.e., transversely to the clamping direction of the clamping unit (DE 34 32 262 A1), or only in the clamping direction of the clamping unit.

Robots are also known, which are movable in all directions in accordance with a pregiven program (company prospectus of Reis, "Reis-Linear-Robot", of 1984).

SUMMARY OF THE INVENTION

It is an object of the invention so to improve an injection molding machine which is of the kind described first hereinbefore that the moldings, particularly if they consist of delicate optical parts or of moldings for use in high-precision apparatus, can be demolded, deposited and carried off quickly and in a gentle manner even if the injection molds are of any desired kind and have one or more mold cavities in any of various arrangements and distributions.

That object is accomplished by the provision of an injection molding machine which is of the kind described first hereinbefore and in which the beams are connected by crosspiece means and extend horizontally over the drive means for the clamping unit, a pallet which is displaceable on pallet tracks is provided over said drive means for the clamping unit and has a supporting surface for retaining moldings, which are arranged in rows at fixed locations, the moldings are movable to said fixed locations by the gripper by means of a second carriage, which is guided on said first carriage for a movement which is transverse to the direction of movement of the first carriage, the first carriage is adapted to be driven via flexible means by a motor, In such an arrangement the fixation of the moldings in rows ensures that a shaking of the pallet as it is carried off or is handled further, e.g., stacked, will not adversely affect highly delicate moldings. Besides, because the moldings are arranged in the pallet in a regular space lattice they can subsequently be consecutively removed by means of a gripper in accordance with a program from the pallet when it is desired, e.g., to package the moldings or to subject them to further processing.

Besides, the masses which are to be periodically accelerated and/or braked in the demolding device are relatively small so that they can be moved at high speeds even over relatively short distances and can exactly be moved to the fixed locations. The pallet can be arranged in the machine so as to save weight and reduce transport distances. In some cases it may be required to produce injection moldings in which metal parts (inserts), such as screw-threaded pins, are embedded, and such inserts must be inserted into the mold cavities before the plastic is injected. In that case it will be necessary to provide a gripper comprising a plurality of gripper elements, which are secured to a horizontal carrier, which is rotatably mounted by means of a vertical axle on the third carriage, which constitutes a lifting bar. For instance, the gripper may comprise two gripper elements and as the molding is removed from the mold cavity an insert for the next molding may be inserted into the now empty mold cavity. To that end a first gripper element of the gripper removes the molding from the mold cavity and moves a small distance away from the mold cavity and the gripper is then rotated through 180° and by means of its second gripper element moves the insert into the now empty mold cavity. The molding held by the first gripper element is subsequently moved to the supporting surface of the pallet, which is provided at least in part with inserts. The molding is then deposited on said supporting surface in a fixed position and the next insert is picked up by the gripper element of the gripper and is transported to an empty mold cavity of the injection mold and so forth.

In a preferred embodiment of the invention, a belt conveyor is detachably mounted in the injection molding machine to serve as transfer means rather than the pallet. In that case the moldings may alternatively be deposited on the pallet at fixed locations or on a belt conveyor so that widely varying requirements regarding the demolding and delivery of highly delicate and less delicate moldings can be complied with. Because the gripper can be moved in three directions, which are at right angles to each other, each fixed location and each mold cavity can quickly and exactly be approached by the gripper. Because the demolding device is supported on both sides by the beams, the carriages can be statically designed at a lower strength limit so that only relatively small masses must be moved to transport the moldings.

BRIEF DESCRIPTION OF THE DRAWINGS

FIG. 4 is a top plan view showing the demolding device of the injection molding machine.

FIG. 5 is a fragmentary view showing a portion of FIG. 4 on a larger scale.

FIGS. 6 and 6a are fragmentary sectional views taken on line VI—VI of FIG. 7 (without beams) and a double gripper.

FIG. 7 is a fragmentary view showing a portion of the demolding device including the second and third carriages viewed in the clamping direction.

FIG. 11 is a sectional view taken on line XI—XI in FIG. 2 and showing the drive means for the first carriage.

FIG. 12 is a sectional view taken on line XII—XII in FIG. 5.

FIGS. 14 to 16 show a stackable pallet of the transfer means of the injection molding machine in enlarged views taken in different directions.

DETAILED DESCRIPTION OF THE PREFERRED EMBODIMENTS

Figure 1:
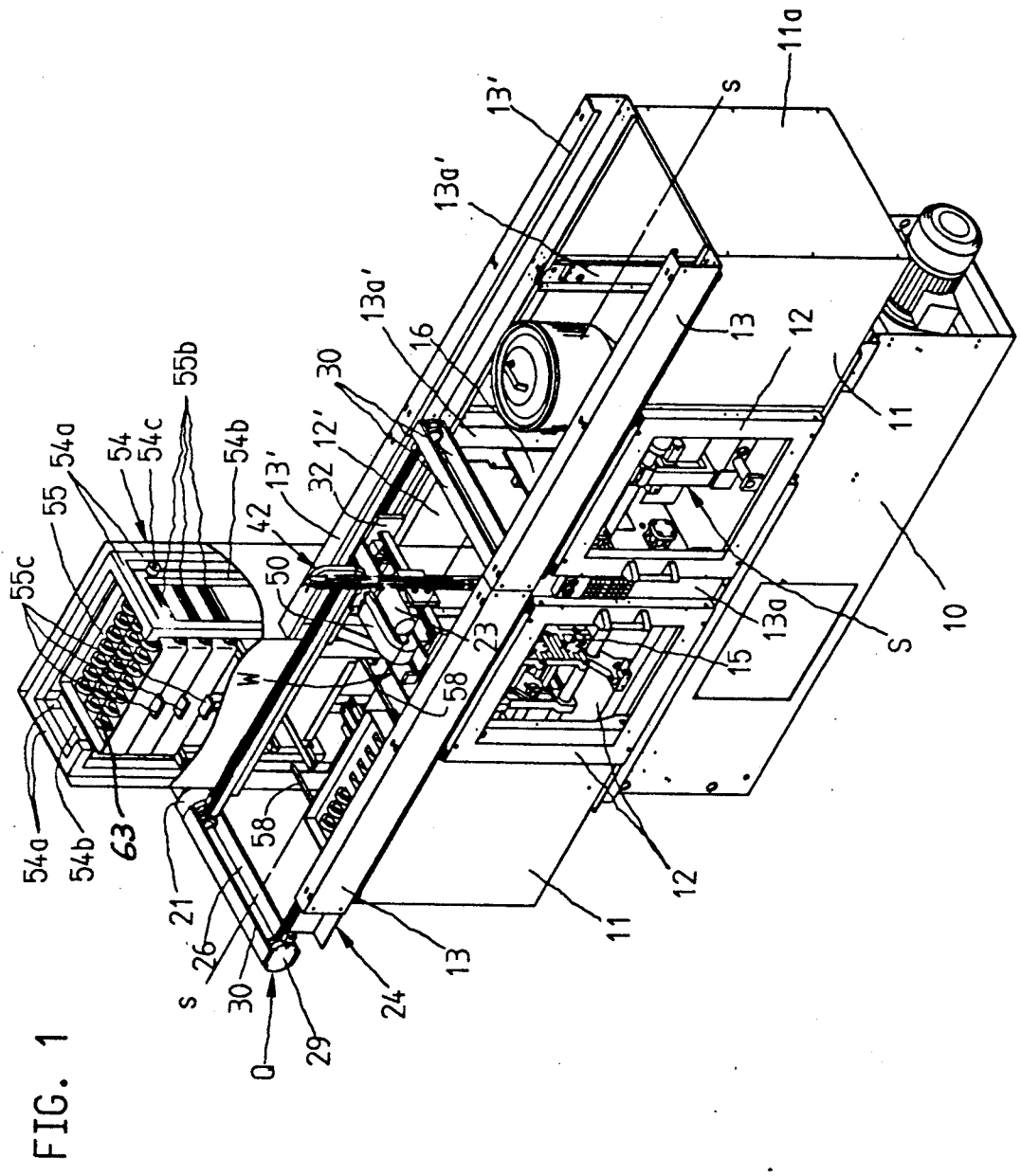
FIG. 1 is a perspective view showing the injection molding machine.

The invention will now be explained in more detail with reference to the drawing.

The injection molding machine is provided with a demolding device for linearly removing the injection moldings 63 from the injection mold 14a, 14b when it is open. The injection molding machine also comprises transfer means for transferring the moldings 63 to means for their further transportation. Said transfer means comprise a supporting surface 55a, on which the moldings 63 can be deposited at fixed locations. The horizontally operable clamping unit W and the horizontally operable injection unit S (FIGS. 2, 2a) are mounted on the machine pedestal. Clamping unit drive means are operatively connected to the clamping unit W. The horizontal beams 13, 13' are provided above each of the units W and S. The beams 13, 13' of each pair thereof are approximately symmetrical to a vertical longitudinal plane of symmetry s—s of the injection molding machine and are supported on the machine frame 10. The two beams 13, 13' extending over the clamping unit W are provided at the top with rails 31, on which a first carriage A is movable by a motor drive. In the illustrated embodiment the first carriage A carried on the rails 31 by means of rollers 39 is approximately symmetrical to the plane of symmetry s—s and is movable from a demolding station disposed over the parting line of the injection mold 14a, 14b to a delivery station (FIGS. 3, 3a). When the first carriage A is in the demolding station the demolding device removes by means of a gripper 53 the moldings 63 from the open injection mold 14a, 14b. In the delivery station the gripper 53 deposits the moldings 63 on the supporting surface 55a of a pallet. The first carriage A comprises a track rail 38, which extends between the two beams 13, 13' at right angles to the plane of symmetry s—s. The rails 31 which support and guide the first carriage A extend throughout the length of the clamping unit W. The rails 31 are secured to the vertical legs 24b of angle bars 24. The horizontal legs 24a (FIGS. 3, 3a, 7) of the angle bars 24 rest on legs of the beams 13, 13', which consist of sheet metal sections. Together with crosspiece assemblies Q, Q', the beams 13, 13' over the clamping unit W constitute a rectangular frame, which is supported on the machine pedestal 10 by means of vertical sectional supports 13a, 13a'. The crosspiece assemblies Q, Q' are identical to each other and consist each of two end flanges 29 and two crossbars 30, which are diametrically arranged on the flanges 29. The track rail 38 of the first carriage A constitutes a track for a second carriage B, which is horizontally movable transversely to the direction of movement of the first carriage A in accordance with a program.

A third carriage C comprises a lifting bar 42 and is vertically guided on guide rollers 52 mounted in a bearing housing 40a of the second carriage B. The gripper 53 for removing the moldings from the injection mold 14a, 14b is mounted on the lifting bar 42 at its lower end.

The design and arrangement of the motor drives for the carriages A, B, C and of the running gears of such carriages will now be described. The track rail 38 of the first carriage A is secured at both ends to bearing brackets 32 by means of bolts 33. Each bearing bracket 32 comprises a flange 32a, in which rollers 39 are rotatably mounted. As is particularly apparent from FIG. 12 in conjunction with FIG. 5, a pair of upper rollers roll on an upwardly facing curved surface 31a of the rail 31 and a pair of lower rollers roll on a properly disposed, downwardly facing curved surface 31b of the rails 31. The carriage A is provided with drive means for driving the second carriage B, which is movable on the track rail 38 of the first carriage A. Those drive means comprise two drive pulleys 36, which are provided with teeth 36a meshing with respective cogged V belts 37, which serve to drive the second carriage B and are adjustable in length. One drive pulley 36 is rotatably mounted in each bearing bracket 32 of the first carriage A and has teeth 36a meshing with the associated cogged V belt 37. One course of each cogged V belt 37 is connected to a bearing housing 40a of the carriage B. A motor 22 is secured to one of the bearing brackets 32 and comprises a drive shaft 22a for driving the drive pulley 36 of the carriage B. A tensioner for the cogged V belt 37 is designated 41. The drive means for the first carriage A are integrated in the crosspiece assembly Q, which is provided at the end of the machine and extends between the two beams 13, 13' and comprises end flanges 29, in each of which a pulley 27 is rotatably mounted, which is provided with teeth 27a, as is particularly apparent from FIG. 11. The two pulleys 27 are non-rotatably connected by coupling elements 26a to a connecting shaft 26. A motor 21 provided with gearing 21b is coaxially secured to one flange 29 and comprises a drive shaft 21a for driving the associated drive pulley 27. The teeth 27a of the two drive pulleys 27 mesh with respective cogged V belts 28. A tensioner for each cogged belt 28 is designated at 41'. One course of each of said belts 28 is connected to the adjacent bearing bracket 32. As is particularly apparent from FIG. 1 the other crosspiece assembly Q' which is associated with the beams 13, 13' and disposed adjacent to the stationary mold support is similar in design to the crosspiece assembly Q provided at the end of the machine but has no connecting shaft. As is particularly apparent from FIG. 2 in conjunction with FIG. 12, the flanges 29 of the crosspiece assembly Q are integrally formed with brackets 29a, which are secured to the rails 31 which support the first carriage A.

Figure 8:
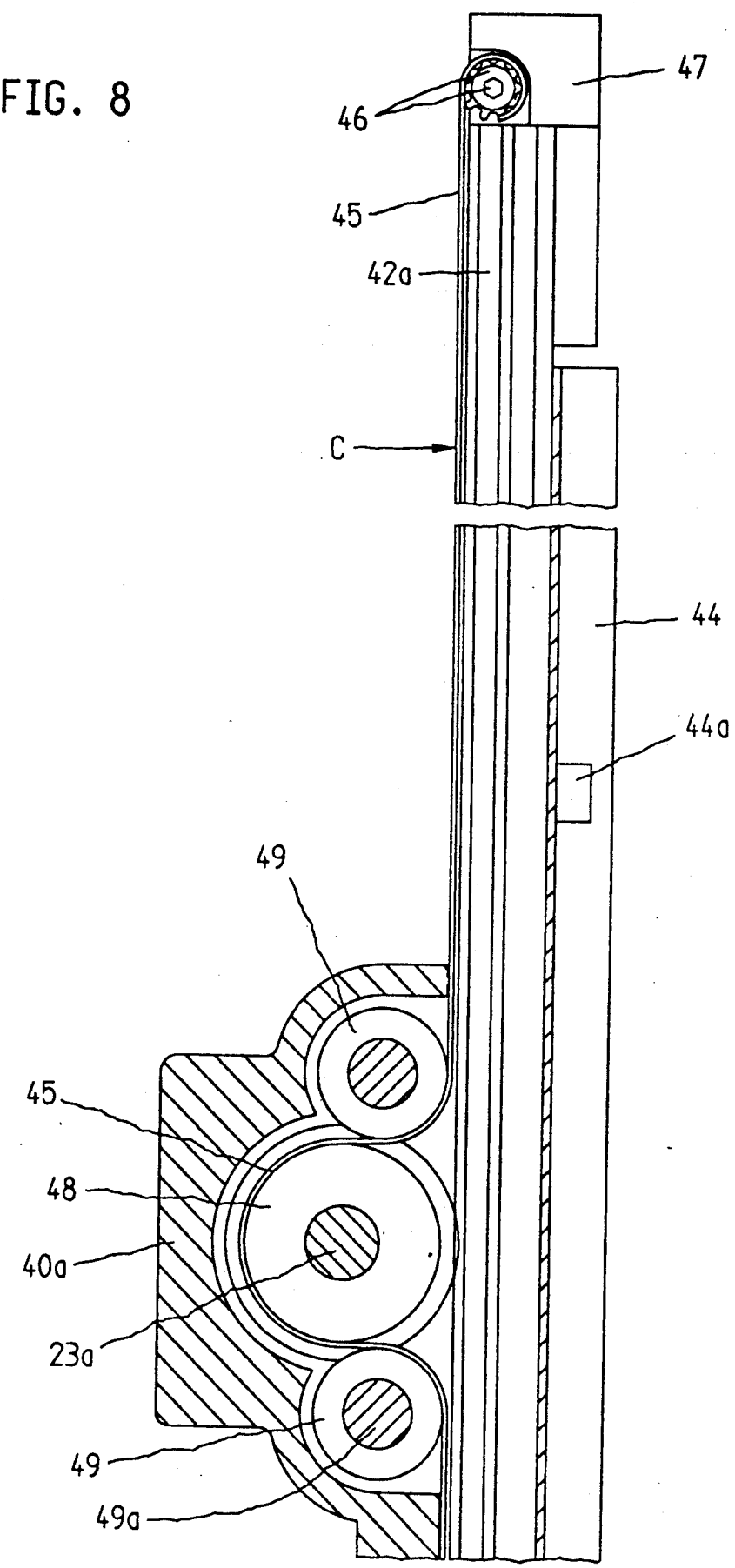
FIG. 8 is an enlarged view showing a portion of FIG. 6.
Figure 9:
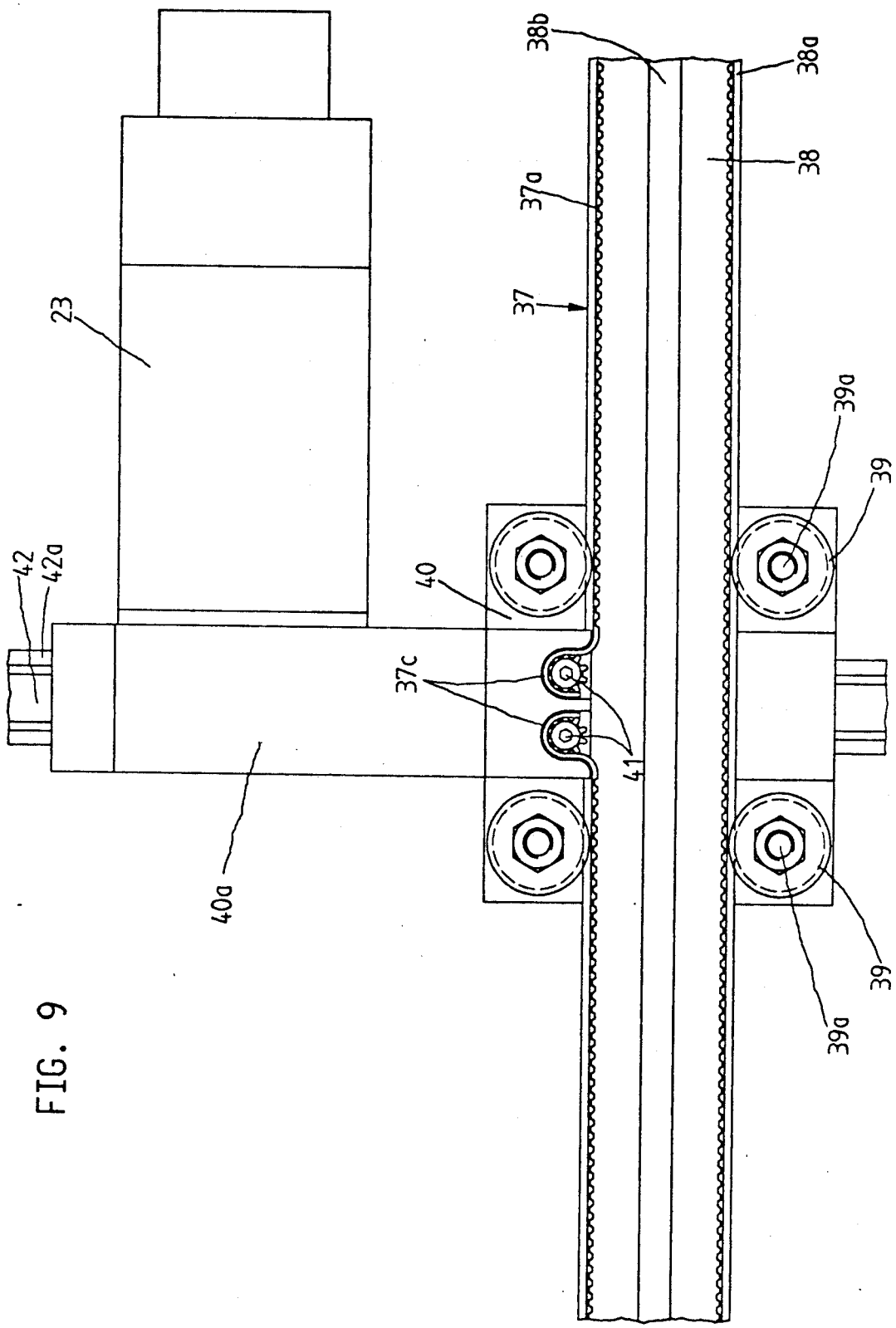
FIGS. 9 and 10 are enlarged elevations showing a portion of FIG. 7 viewed in mutually opposite directions.
Figure 10:
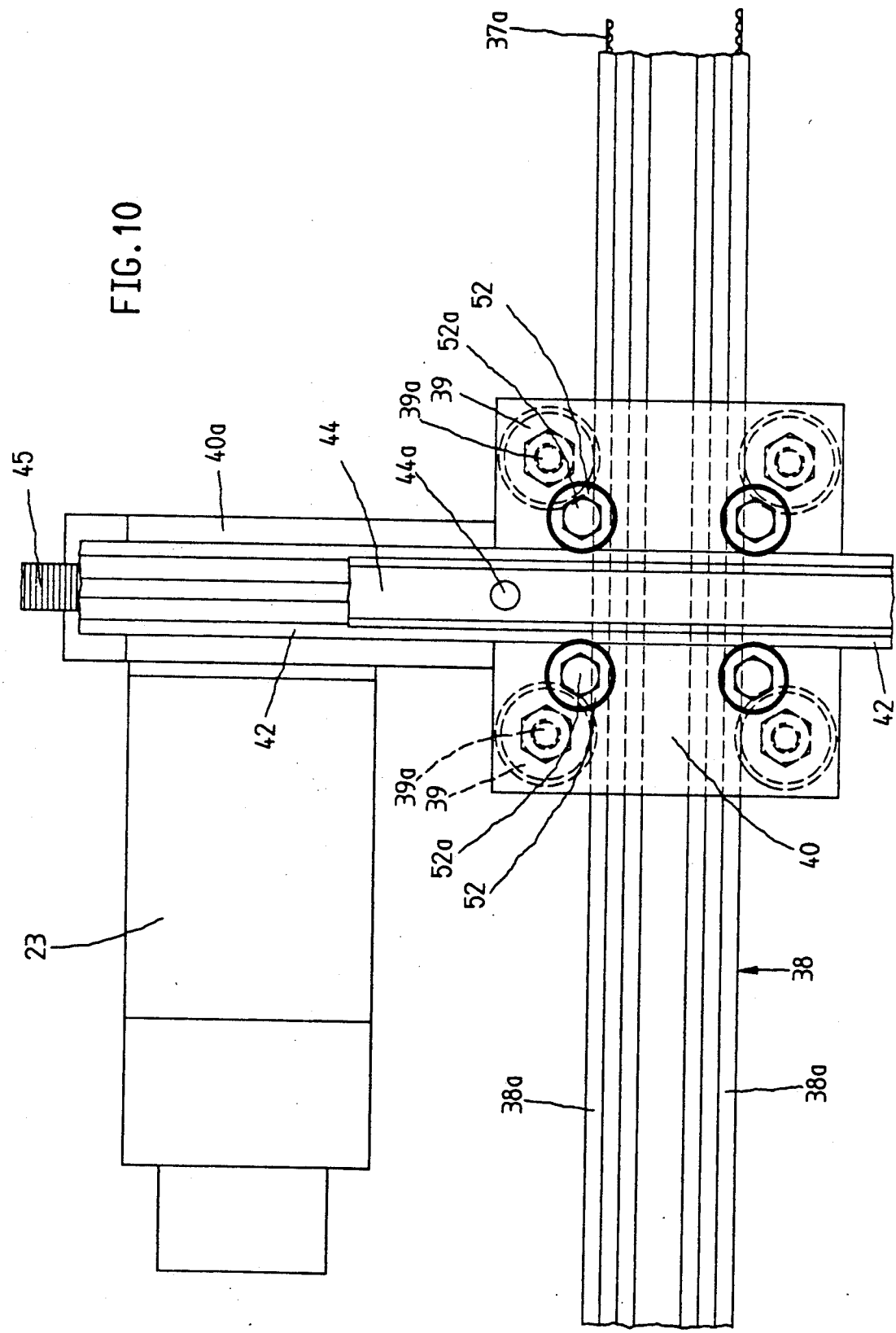

The second carriage B comprises a body 40, which by means of rollers 39 is movable on curved surfaces 38a of the track rail 38 of the first carriage A. On that side of the carriage body 40 which faces the injection mold 14a, 14b the rollers 39 are rotatably mounted on the body 40 by fixing screws 39a (FIG. 9). The driving top course 37a of the cogged V belt 37 has tensioning end portions 37c, which are connected to the carriage body 40 by means of tensioning gears 41, as is particularly apparent from FIG. 9. The carriage body 40 is platelike and is enlarged at its top to provide a bearing housing, which is cross-section has the shape that is particularly apparent from FIG 6. A drive pulley 48 is secured to the motor shaft 23a of the drive motor 23 and meshes in the bearing housing 40a with a cogged V belt 45. That belt 45 is held by means of passive pressure-applying rollers 49 in mesh with the teeth of the drive pulley 48. The pressure-applying rollers 49 are rotatably mounted on axles 49a in the bearing housing 40a (FIG. 6). A third carriage C comprises a lifting bar 42, which is guided on guide rollers 52, which are rotatably mounted in the bearing housing 40a (FIG. 6). The lifting bar 42 is adapted to be driven by the V belt 45, which has free ends, which are connected by tensioning screws 46, 46a to the lifting bar 42, and is under a tension which is adjustable by the tensioning screw 46, which is mounted in the bearing bracket 47. As is particularly apparent from FIGS. 5 and 10, the lifting bar 42 is reinforced on its outer longitudinal side face with a channel-section stiffening bar 44, which is connected to the lifting bar 42 by fixing screws 44a (FIGS. 5, 8, 10).

Power supply bars 50 are provided to supply electric power to the motors for driving the carriages.

Figure 13:
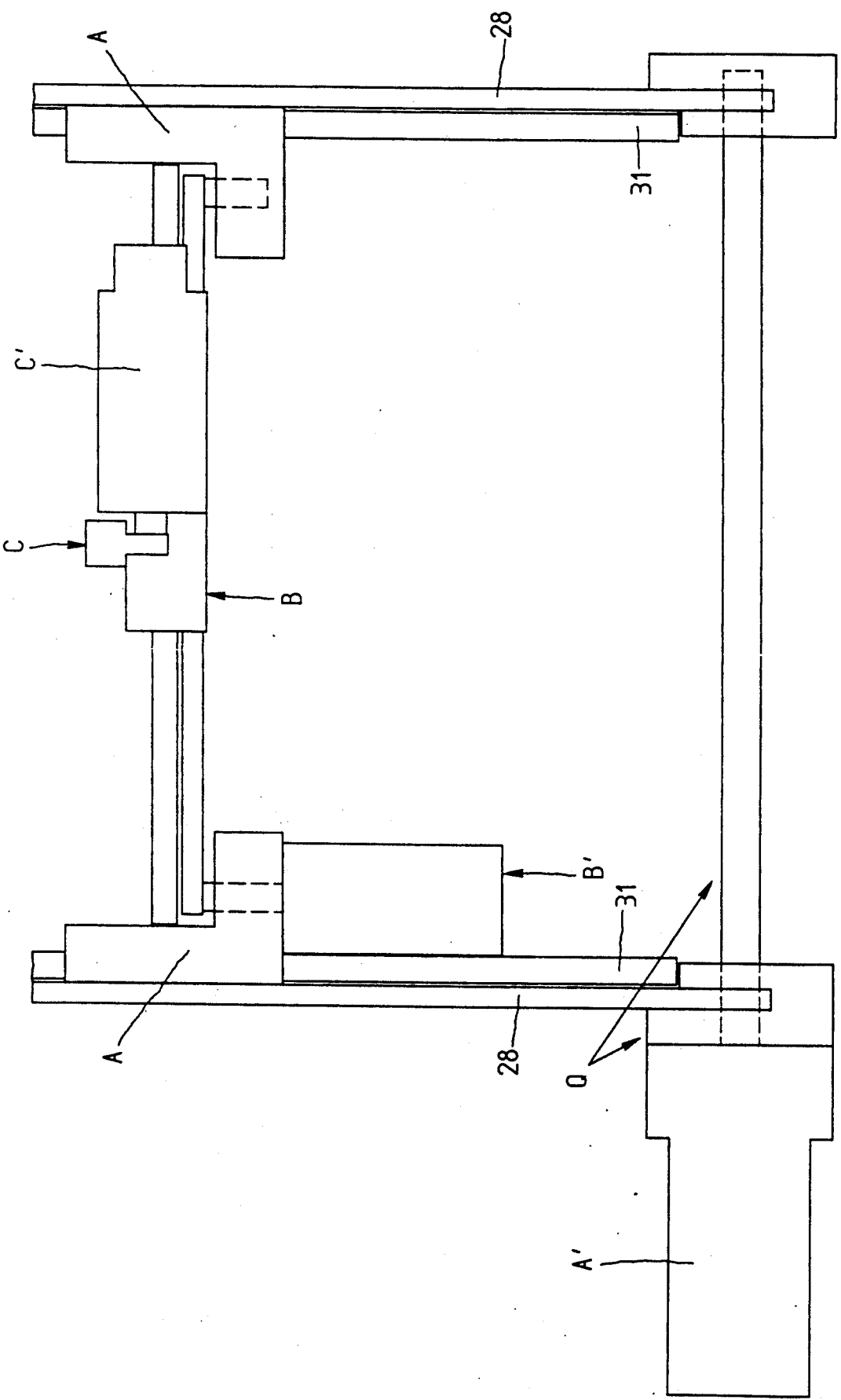
FIG. 13 is a diagrammatic view showing the arrangement of the carriages and the associated drives.

FIG. 13 is a diagram from which the relationship of the carriages A, B and C and the associated drive motors designated A', B' and C' is apparent.

Figure 2:
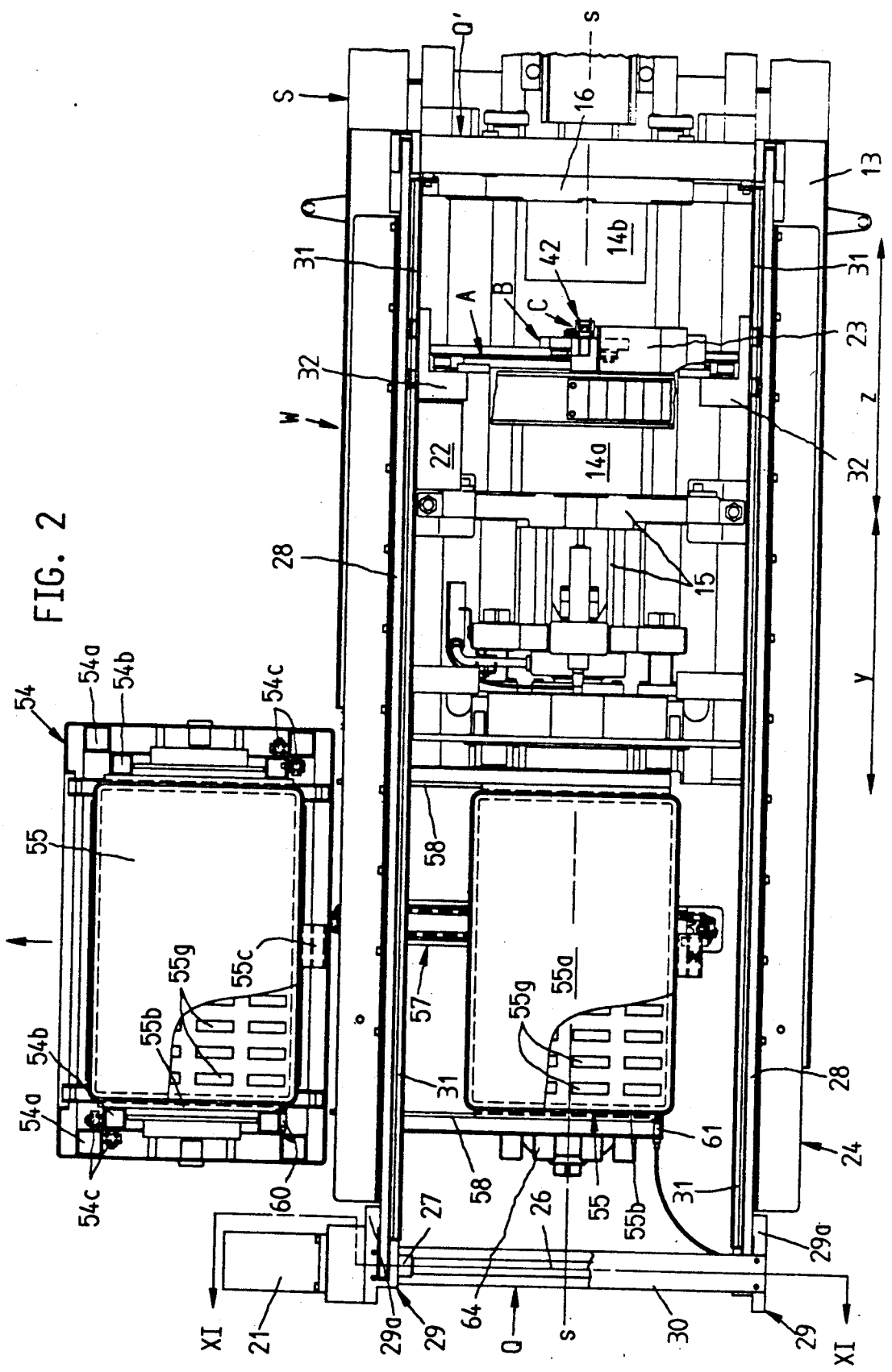
FIGS. 2 and 2a show the clamping unit of the injection molding machine with two embodiments of the demolding and transfer means.
Figure 3:
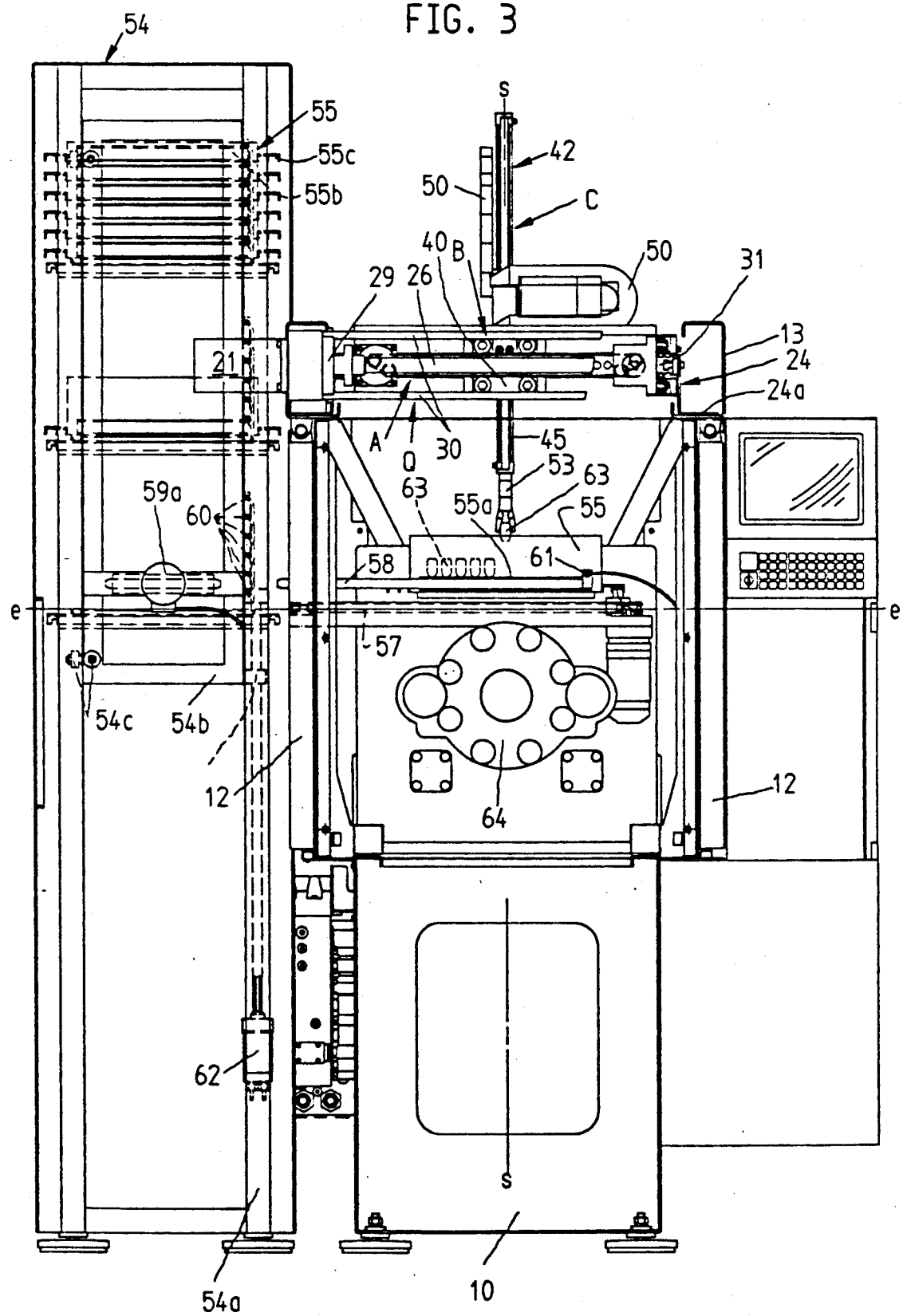
FIGS. 3 and 3a are end elevations showing the embodiments of FIGS. 2 and 2a, respectively.
Figure 3A:
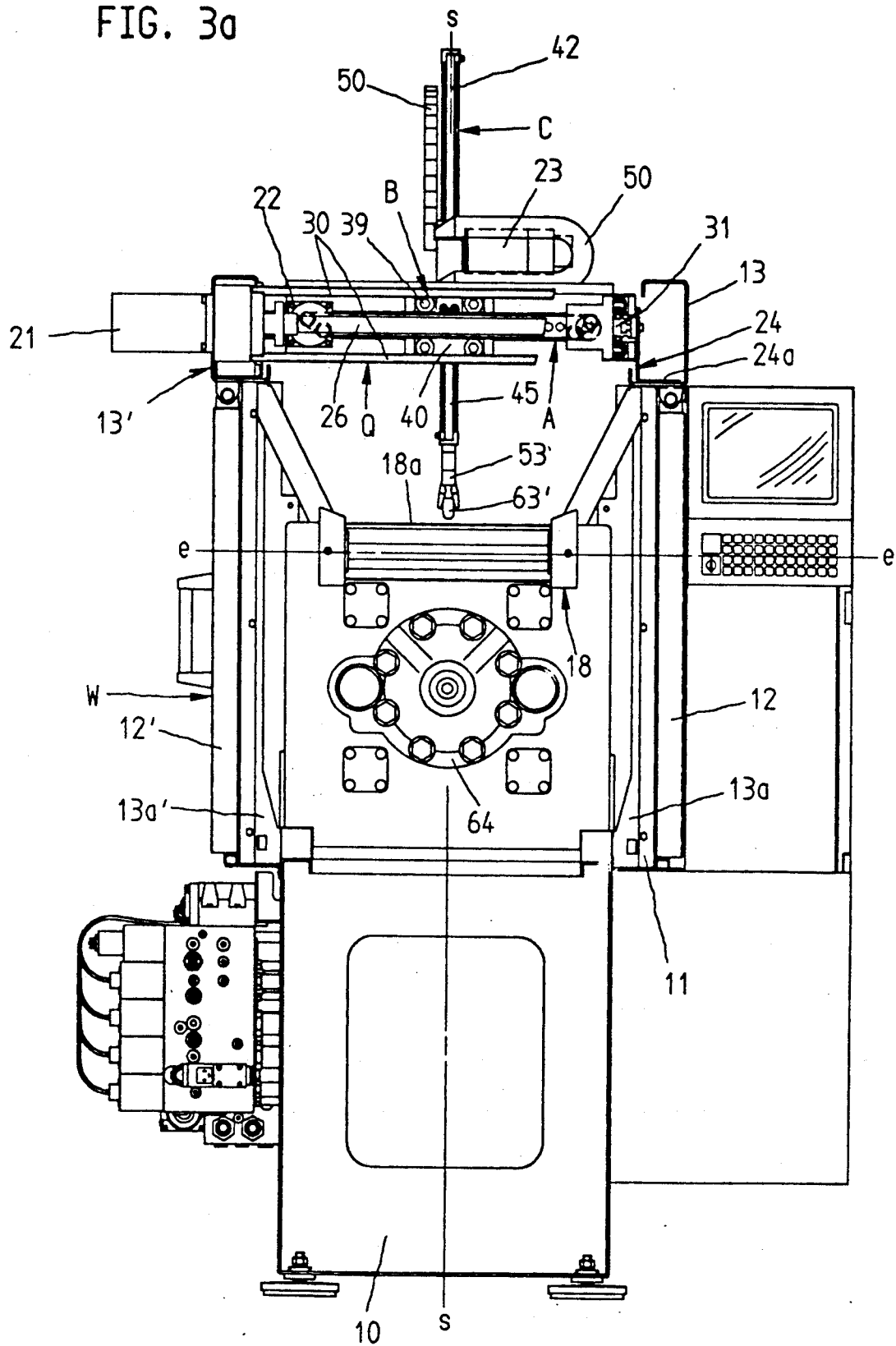
Figure 17:
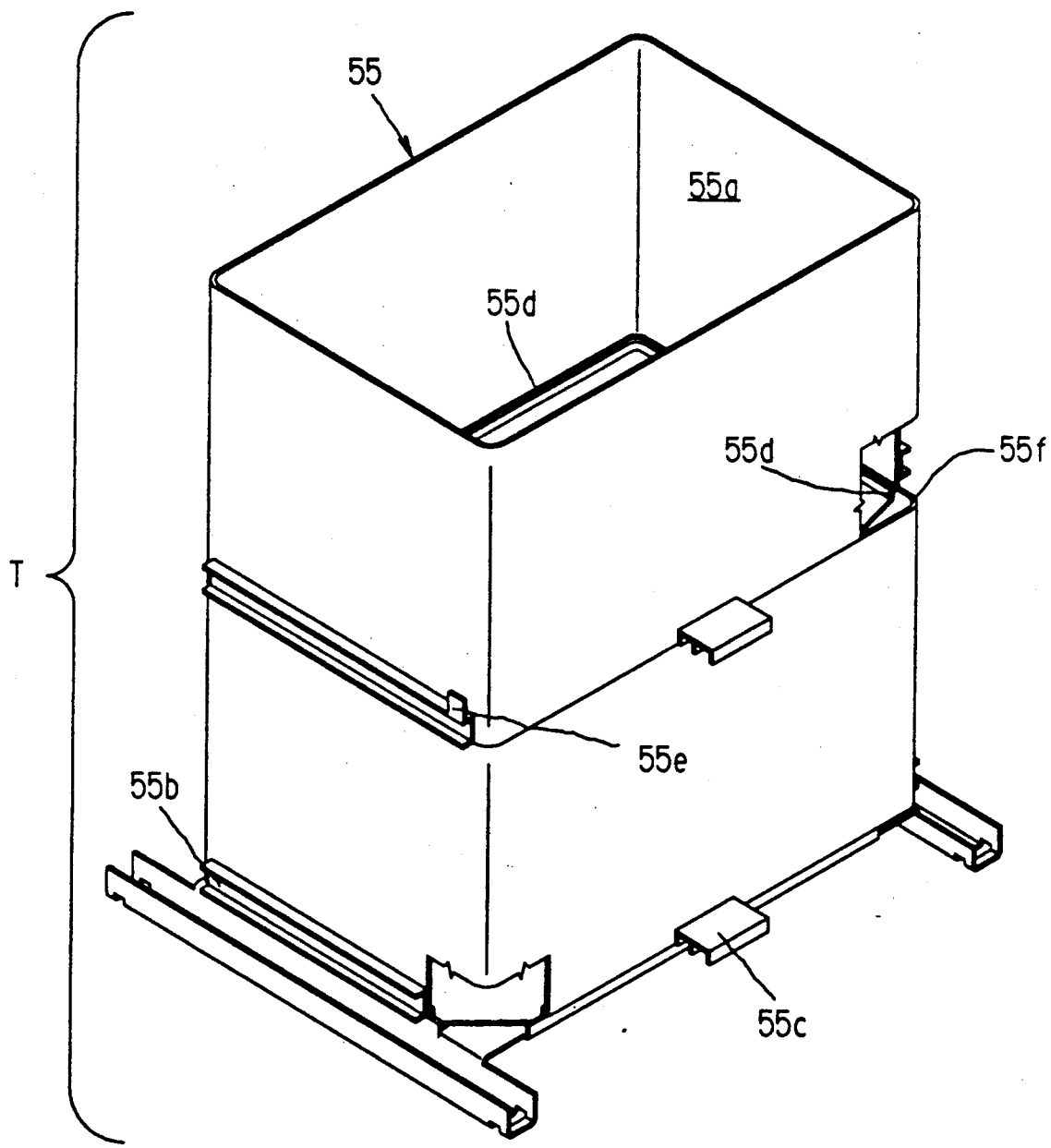
FIGS. 17 to 19 show respective pallets and carried by a transport pallet.
Figure 18:
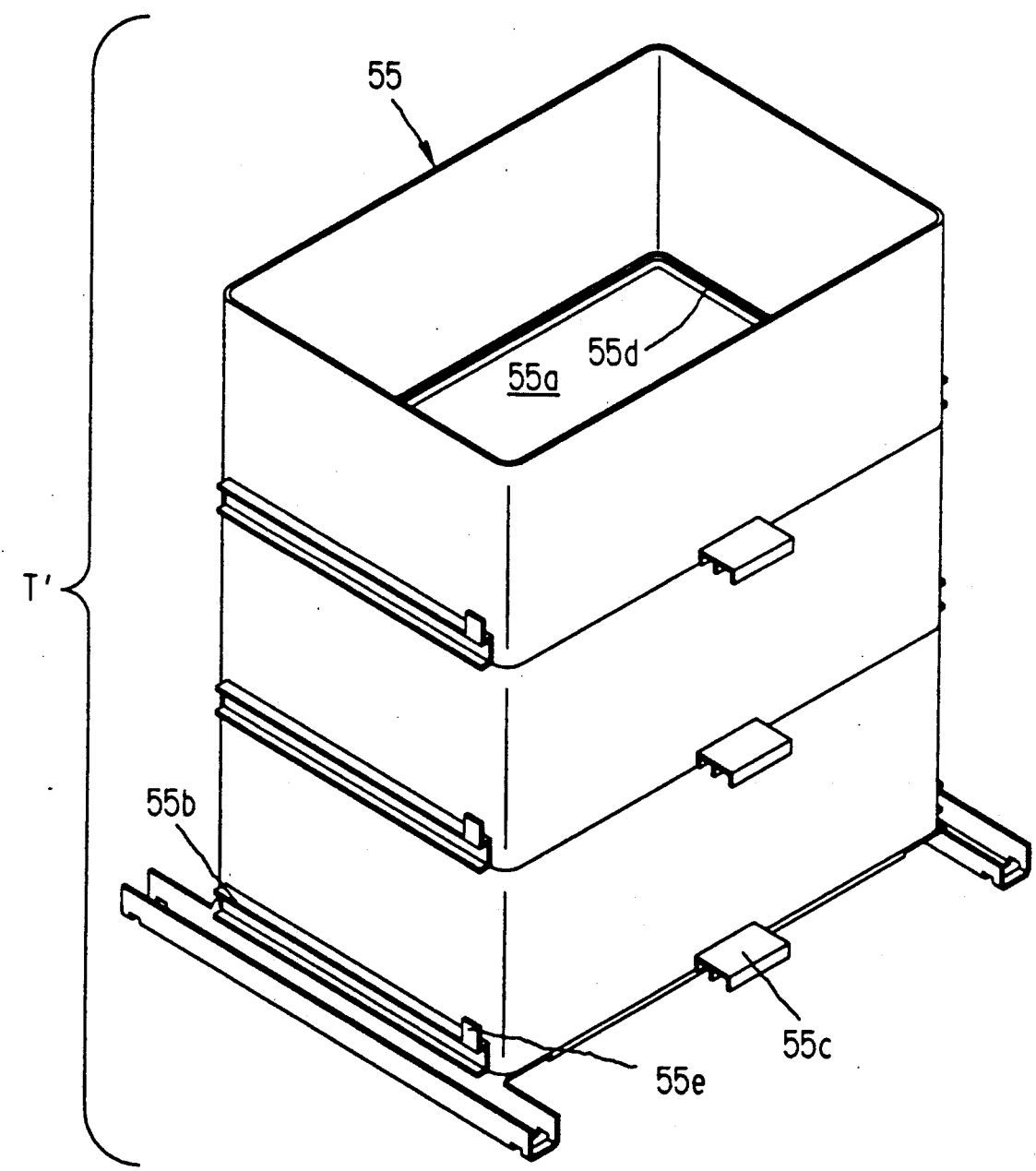
Figure 19:
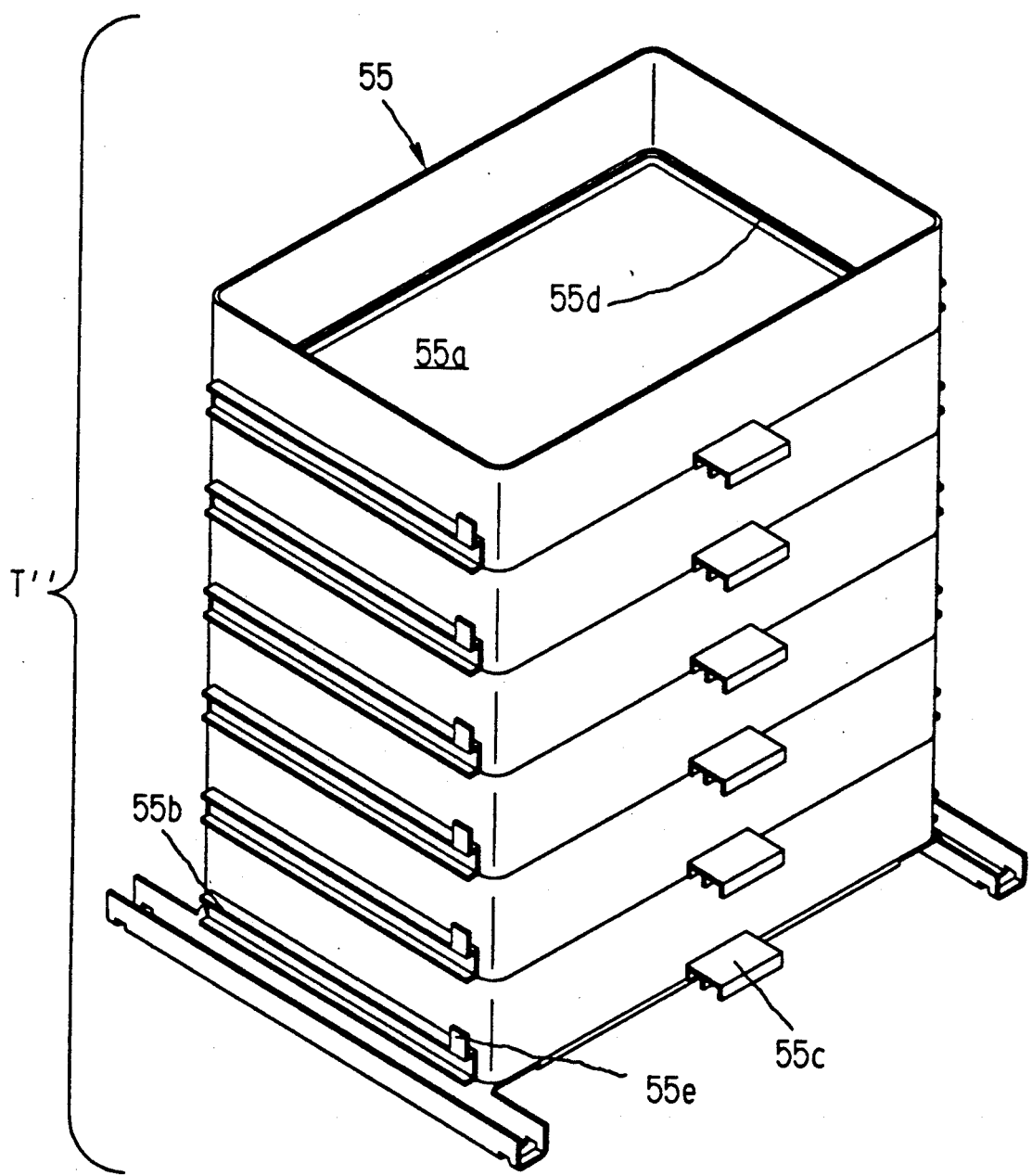

In accordance with FIGS. 1 to 3 the transfer means comprise a stackable pallet 55, which is provided with a supporting surface 55a for locating the moldings 63. When, e.g., the second carriage B is intermittently moved in a controlled manner, the moldings 63 may be deposited on the stackable pallet 55 in rows by the gripper 53 at fixed locations, which are defined, e.g., by retaining recesses 55g (FIG. 15). Instead of retaining recesses 55g, the supporting surface 55a may be provided with other locating means, such as regular grids of bars, which define mesh spaces in which each molding is received in part. Particularly with moldings having a simple shape, e.g., with moldings which can be supported in a state of stable equilibrium on a planar horizontal retaining surface, it will be possible to provide locating means for locating an entire row of moldings only at the edges of the pallets. In that case the moldings will be deposited in a row by the gripper and that row when it has been completed will be retained in its entirety by the retaining means provided at the edges. FIG. 2 shows a stackable pallet 55, which is spaced a distance y (FIG. 2) from the fixing surface of the movable mold support 15. That distance y is approximately as large as the distance z between the fixing surfaces of the two mold supports 15, 16 when the injection mold 14a, 14b is open. The supporting surface 55a and the top edge of the injection mold 14a, 14b lie approximately in a common horizontal plane e—e. The stackable pallet 55 which is loaded with moldings 63 can be displaced on stationary pallet tracks 58 of the injection molding machine at right angles to the plane of symmetry s—s, between a receiving position over the clamping unit drive means 64 and a delivery position laterally offset from said clamping unit drive means 64. Said pallet tracks 58 support overlying ledges 55b provided at opposite ends of the stackable pallet 55. Beside the supporting surface 55a, a pallet tower 54 for stacking pallets is provided on the rear of the injection molding machine and in a top plan view conforms to the supporting surface 55a. The fully loaded stackable pallets 55 are transferred into said pallet tower and stackable pallets 55 which are empty or loaded with inserts are removed from said tower 54. The pallet tower 54 comprises a stationary frame, which is constituted by a skeleton structure 54a consisting of section members, and an elevator 54b, which is guided by vertical posts of the skeleton structure 54a and is vertically movable by means of a lifting motor 62, which is supported by the skeleton structure 54a. Each stackable pallet 55 consists of a single plastic member and is provided with a vertical guard wall, which surrounds the bottom of the pallet. In a top plan view, the area of the bottom is smaller than the area of the entire stackable pallet 55. That portion of the plastic member which constitutes the bottom of the pallet 55 is connected by a centering portion 55d, which is upwardly and slightly outwardly inclined from the vertical, to the vertical guard wall (FIG. 14a). Stackable pallets 55 having guard walls which are equal in height can be stacked to form pallet stacks T, T', T'' (FIGS. 17 to 19). Said stacks have the same overall dimensions. In dependence on the height of the guard walls of the stackable pallets of each stack, the stacks may contain stackable pallets 55 in different numbers. Non-contacting sensors 60 for pallet identification are provided in the skeleton structure 54b of the pallet tower 54 in a number which is equal to the largest number of pallets which can be accommodated in a stack, e.g., T'''. The spacing of the sensors 60 equals the height of a stackable pallet 55 having the smallest height. The sensors 60 cooperate with encoding noses 55e provided on the stackable pallets. Owing to that arrangement the computer which is associated with the injection molding machine can determine the number of stackable pallets 55 which are contained in the pallet tower and whether a stack is composed as shown in FIG. 17 or 18 or 19. A non-contacting sensor 61 for the detection of a stackable pallet 55 is also provided at one end of the supporting surface 55a of a stackable pallet 55 when it is in its receiving position.

Because the moldings are retained in respective recesses 55g (FIG. 15) of the stackable pallet 55, the moldings 63 can automatically be removed from said recesses in accordance with a program by means of a gripper or the like when the moldings 63 are to be processed further. In case of need the gripper 53 may be replaced by a double gripper 153, as is shown in FIG. 6a. This will mainly be required in the making of moldings which contain embedded metallic inserts. In that case the double gripper 153 will operate as follows. One gripper element 153b or 153c is used to remove a molding from a mold cavity. Thereafter the double gripper 153 is moved a small distance away from the mold cavity and rotates through 180° about the axle 153a and by means of a second gripper element 153c or 153b places an insert into the empty mold cavity. The molding that is held by the first gripper element 153b or 153c is then transported to the supporting surface 55a. Each stackable pallet 55 which contains no molding may be loaded with inserts before the pallet is supplied to the injection molding machine. In that case the empty gripper element 153b or 153c may remove from the retaining recess the insert to be used in making the next molding before a molding is placed into the retaining recess.

Figure 2A:
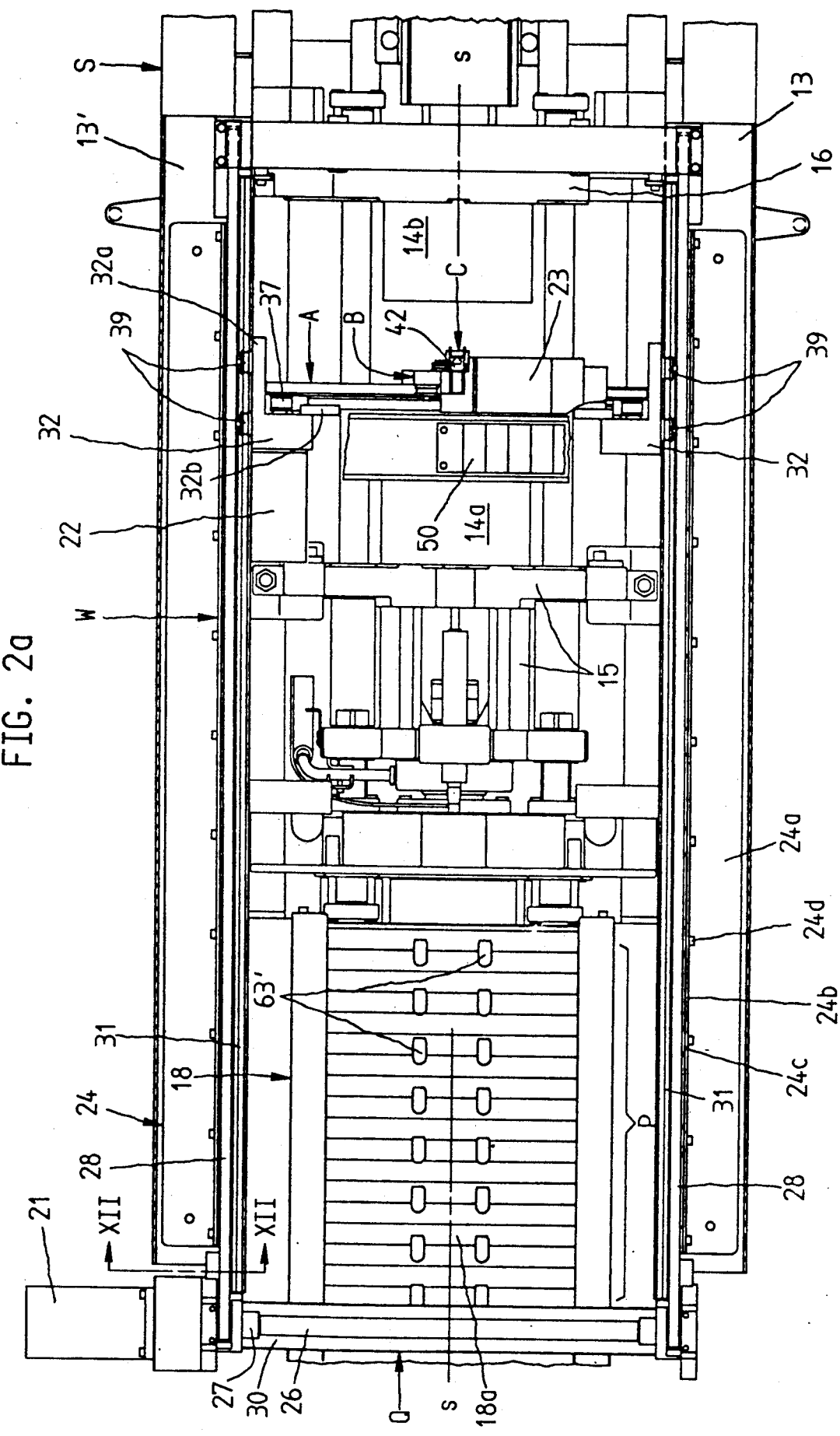

For making molding 63' which are not so susceptible to being contacted, the transfer means consisting of the stackable pallets 55 and the pallet tower 54 may be replaced in the injection molding machine by different transfer means, which may be incorporated in or attached to the machine and are operable to move the moldings out of the top plan area of the clamping unit W on a path which is parallel to the plane of symmetry s—s. In such transfer means the surface 18a for supporting the moldings is constituted by a conveying surface of a conveying belt 18 (FIGS. 2a, 3a). That surface 18a for supporting the moldings is arranged in the injection molding machine like the supporting surface 55a which is constituted by a stackable pallet, as is particularly apparent from a comparison of FIGS. 3 and 3a. The injection molding machine shown in FIGS. 1 to 3 can be converted with only a reasonable amount of work to the embodiment shown in FIGS. 2a and 3a. The injection molding machine may be delivered to the customer in either of said forms and can be supplemented or altered by the customer when this is required. In that case the injection molding machine will comply with all requirements which are conceivable in practice. Each of the two transfer means are disposed over the drive means 64 for operating the movable mold support 15.

The reference characters 11, 11a, 12, 12' designate stationary and movable guards. As is apparent from FIG. 7 the rail 31 and the angle bar 24 are interconnected by fixing screws 24d and spaced apart by the spacers 24c. The track rail 38 is secured to the mounting portion 32b of the bearing bracket 32 by fixing screws 33, which are screwed into sliders 34, which are slidable in a tensioning groove 38b that is formed in the track rail 38 and are restrained against being pulled out of said groove 38b. The vertical lifting bar 42 comprises a guiding bar 42a. The guide rollers 52 are rotatably mounted on pins 52a. The elevator 54b is guided by rollers 54c on the stationary frame 54a of the pallet tower. In each pallet stack, the top edge 55f of each lower stackable pallet 55 is in contact with the horizontal contacting surface 55h of the next upper stackable pallet 55. Each stackable pallet 55 is provided with a coupling member 55c, which is engageable by a chain 57, which is operable to move the stackable pallet out of and into the pallet tower 54.

I claim:

1. In an injection molding machine having a vertical longitudinal plane of symmetry, comprising
a machine pedestal,
a clamping unit including an injection mold having a stationary mold part and a movable mold part; the clamping unit further including a movable mold support supporting said movable mold part and operable to move said movable mold part relative to said stationary mold part between open and closed positions of the injection mold; said stationary and movable mold parts defining a parting line in said closed position;
a clamping unit drive means disposed on a side of said movable mold support for moving said movable mold support relative to said stationary mold part into said open and closed positions; and
a demolding device for linearly removing a molding from said mold in the open position thereof; said demolding device comprising
two horizontal beams supported by said machine pedestal and extending above said clamping unit parallel and symmetrically to said plane of symmetry;
track rail carried by said beams;
a first carriage supported by said track rails and movable between a demolding position over said parting line and a delivery position remote from said parting line; and
a third carriage mounted on said first carriage; said third carriage carrying a gripper and being vertically movable to move said gripper into said mold in the open position thereof and in the demolding position of said first carriage;
said injection molding machine further comprising transfer means supported by said pedestal and disposed between said beams for receiving said moldings from said gripper when said first carriage is in said delivery position and for delivering said moldings from said injection molding machine;
the improvement comprising
crosspiece means extending horizontally over said clamping unit drive means for interconnecting said beams; said crosspiece means being situated externally of a vertical projection of a basic outline of the injection molding machine;
a horizontal pallet track and a horizontal pallet movable on said pallet track from a receiving position between said two horizontal beams over said clamping unit drive means to a delivery position offset from said clamping unit drive means; said horizontal pallet track and said horizontal pallet forming part of said transfer means; said horizontal pallet having a top supporting surface and means for retaining a plurality of moldings at fixed locations, arranged in rows, on said top supporting surface;
a carriage drive motor mounted on said beams and having a drive shaft mounted on said cross-piece means;
means for defining a longitudinal trough in each said horizontal beam;
flexible means for operatively connecting said drive shaft of said carriage drive motor to said first carriage; said flexible means comprising two flexible elements extending in the troughs of said horizontal beams; said two flexible elements being arranged symmetrically to said vertical longitudinal plane of symmetry;
a second carriage mounted on said first carriage for a horizontal movement at right angles to said beams; said third carriage being mounted on said second carriage;
said third carriage being operable in consecutive positions to deposit consecutive moldings by said gripper on said supporting surface on said fixed locations, in said means for retaining a plurality of moldings.

2. The improvement set forth in claim 1, wherein said pallet is stackable and is formed in said supporting surface with recesses for receiving and retaining a plurality of said moldings at said fixed locations.

3. The improvement set forth in claim 2, wherein
said pallet consists of single plastic member having a bottom, a vertical guard wall surrounding said bottom and a centering transitional portion, which is outwardly and upwardly inclined from a vertical direction and connects said bottom to said guard wall so that the area of said bottom is smaller than the area of said pallet in a top plan view.

4. The improvement set forth in claim 3, wherein a plurality of such stackable pallets are associated with said injection molding machine and are adapted to be stacked to form a plurality of stacking having equal dimensions.

5. The improvement set forth in claim 1, wherein
said supporting surface is rectangular in a top plan view and
a non-contacting sensor is provided adjacent to one end of said supporting surface of said pallet when said pallet is in said receiving position.

6. The improvement set forth in claim 1, wherein
said beams consist of sheet metal sections,
said first carriage comprises a horizontal track rail, extending at right angles to said beams, and
said second carriage is movable on said track rail.

7. The improvement set forth in claim 6, wherein
each of said crosspiece means comprise end flanges and crossbars, said crossbars being secured to said flanges at diametrically opposite locations, and
said first carriage drive motor is operatively connected via said first flexible means to said first carriage by drive pulleys, which are rotatably mounted in said end flanges of one of said crosspiece means.

8. The improvement set forth in claim 1, wherein said flexible means comprises a first flexible means and said carriage drive motor is a first carriage drive motor; further wherein
said third carriage comprises a lifting bar carrying said gripper,
said second carriage comprises a bearing housing and guide rollers which are rotatably mounted in said bearing housing and arranged to vertically guide said lifting bar,
second flexible means for operatively connecting a second carriage drive motor to said second carriage,
said first and second flexible means comprise cogged V belts,
a third carriage drive motor is provided for driving said third carriage; said third carriage drive motor having a drive pulley, which is rotatably mounted in said bearing housing, and
a cogged V belt having a finite length in mesh with said drive pulley and being connected to said third carriage.

9. The improvement set forth in claim 1, wherein
said pallet is removable from said injection molding machine and is replaceable by transfer means which comprise a conveyor having a supporting surface for receiving consecutive moldings from said gripper when said first carriage is in said delivery position and for delivering said moldings from said machine.

10. The improvement set forth in claim 9, wherein
said mold has a horizontal top edge and
said supporting surface of said pallet and said supporting surface of said conveyor extend in a horizontal plane which is approximately on a same level as said top edge of said mold.

11. The improvement set forth in claim 1, wherein
said gripper consists of a gripper assembly, said assembly comprising a horizontal carrier and a plurality of gripper elements secured to said carrier, and
said carrier being mounted on said third carriage for rotation about a vertical axis.

* * * * *